2,803,557

RELEASE COATING FOR PRESSURE SENSITIVE ADHESIVE SHEET MATERIAL AND PROCESS OF MAKING A SHEET COATED WITH THE SAME

John B. Martin, Camas, Wash., and Chester S. Funk, San Leandro, Calif., assignors to Crown Zellerbach Corporation, Camas, Wash., a corporation of Nevada No Drawing. Original application October 27, 1950, Serial No. 192,596, now Patent No. 2,648,614, dated August 11, 1953. Divided and this application January 23, 1953, Serial No. 333,005

16 Claims. (Cl. 106—194)

This invention relates to a release coating for pressure sensitive adhesive sheet material, particularly that used industrially and domestically in rolled tape form.

This application is a division of the application by John B. Martin and Chester S. Funk, Serial No. 192,596, filed October 27, 1950, now Patent No. 2,648,614, for Pressure Sensitive Adhesive Sheet Material.

Currently manufactured pressure sensitive adhesive tapes comprise a flexible backing strip to which is applied a tacky adhesive surface coating. In their conventional form, they are constructed in such a manner that they may be removed cleanly from virtually any solid, cohering surface to which they have been applied. Essential to this performance is the use of backing material which is sufficiently strong so that it will not tear or delaminate under the pull of removal. Consequently it is the practice to employ non-fibrous, unsupported films such as regenerated cellulosic films, as well as fibrous sheets which have been unified and strengthened by impregnation with bonding agents such as glue, rubber or plastic.

However, in many applications, such as in the wrapping and packaging of small and medium-sized objects, the clean removal of the adhesive tape is non-essential since the used tape and wrappings are discarded after a period of use. In these applications, the use of tape incorporating strong sheet materials or unified laminates therefore is an unnecessary extravagance. A tape made of ordinary kraft paper or similar material would be fully suitable.

The use of kraft paper and similar backing materials is attended by the problem, however, that when the tape is rolled up on itself the adhesive coating on one side of the backing contacts the other side of the backing and becomes adherent thereto. The resulting bond then is sufficient to cause delamination of the backing material upon unrolling the roll, unless the exposed face of the backing has been given a special treatment to prevent sticking of the adhesive thereto. This is particularly difficult to accomplish since, even though the release coating may repel the adhesive in the freshly manufactured tape, upon prolonged contact between the two, chemical and physical changes are prone to occur which destroy the repellency of the release coating, cause the amalgamation of the two coatings, or otherwise negative the desired effect.

It, therefore, is the general object of the present invention to provide a release coating for a pressure sensitive adhesive tape which sheet material may be rolled up on itself and subsequently unrolled easily and without delamination of the backing material even though the latter may be of a fibrous structure, as ordinary kraft paper.

Still another object of the present invention is the provision of a release coating for pressure sensitive, adhesive sheet material which retains its release properties over long storage periods.

Still another object of the present invention is the provision of a release coating for pressure sensitive adhesive sheet material which is easily and inexpensively manufactured.

Still another object of this invention is the provision of a novel and efficient process for the manufacture of a release coating for pressure sensitive adhesive sheet material.

We now have discovered that the foregoing and other objects of this invention may be accomplished by providing a pressure sensitive adhesive tape wherein the flexible backing material is a sheet or strip of fibrous paper or similar material one surface of which has been coated with an adhesive composition comprising vulcanized rubber, and the other surface of which has been coated with a release coating comprising a reaction product of hydroxyethyl cellulose and a chromium salt of an acyclic carboxylic acid having at least ten carbon atoms, preferably a chromium stearate. We have discovered further that the aforesaid reaction product of hydroxyethyl cellulose and chromium salt may be prepared in a form especially suitable for the purposes of the present invention by reacting the hydroxyethyl cellulose with a complex compound of the Werner type in which a trivalent nuclear chromium atom is co-ordinated with an acyclic carboxylic acido group having at least ten carbon atoms, for example, chromium stearato chloride.

The presently described pressure sensitive adhesive sheet materials may be prepared using ordinary kraft paper as produced by the mill without any subsequent unifying treatment. This flexible starting material is coated on one side with a pressure sensitive adhesive and on the other with a release coating, it being immaterial for the purposes of this invention which of these processes is carried out first. However, for purposes of commercial operation, repellent treatment prior to adhesive application is preferable.

THE RELEASE COATING

As has been indicated above, the release or repellent coating broadly comprises hydroxyethyl cellulose and a chromium salt of an acyclic carboxylic acid. The hydroxyethyl cellulose may be the ordinary commercial product available as a water soluble, dry material ("Cellosize"). The chromium salt of the acyclic carboxylic acid may be any member of this group having at least ten carbon atoms, for example chromium laurate, chromium oleate, chromium palmitate or chromium stearate. Chromium stearate is a preferred member of this group, and the present invention is described with particular reference thereto, although no limitation is thereby intended.

The chromium stearate and other chromium salts preferably are employed in the form of their water soluble, metal soaps, for example chromium stearato chloride ("Quilon"). This is a water soluble, complex compound of the Werner type in which a trivalent, nuclear chromium atom is co-ordinated with a stearato group. It is commercially available as a dark green, alcoholic solution having a solids content of about 40% by weight. Its preparation and structure are fully disclosed in United States Letters Patent 2,273,040.

There also may be included in the repellent composition modifying agents to give the final film a desired flexibility and buffer chemicals to take up the hydrochloric acid released from the chromium stearato chloride. The modifying agent may comprise any suitable materials such as, for example, glycerine, sorbitol or propylene glycol. The buffer may comprise any of the chemical compounds or mixtures customarily used for pH adjustment, which will not react deleteriously with the other constituents of the tape. Urea, sodium formate and sodium acetate are examples of suitable buffers.

The modifier and buffer may be used in any suitable proportions, for example up to about two parts by weight of modifier for each two parts of hydroxyethyl cellulose. The buffer may be employed in amount sufficient to prevent gelling of the chromium salt with resultant high viscosity solutions and inferior release characteristics of the final film. However, it should not be used in amounts sufficient to reduce the pH of the final coat to levels at which the paper backing is rendered brittle during the subsequent drying operations. In general, therefore, the buffer should be used in amounts sufficient to adjust the pH of the final coating to a range of between about pH 3.0 and about pH 5.0.

As a further constituent of the release coating compositions, there is employed a carrier or solvent material. This, preferably, may be an aqueous solvent, either water alone or water in admixture with a suitable water soluble, organic solvent, e. g. ethyl alcohol or propyl alcohol. Such an aqueous solvent is a mutual solvent for the hydroxyethyl cellulose and the chromium salt and enables proper application of the release coating in a thin, continuous film to the flexible backing material. The solvent or carrier should be employed in amount sufficient to give a solution having the desired viscosity characteristics for the particular release coating composition employed and the particular applying means contemplated.

A preferred release coating composition for use in the pressure sensitive tapes of the present invention is set forth in Table I, wherein the proportions are given as parts by weight.

Table I

| | |
|---|---|
| Hydroxyethyl cellulose | 5. |
| Chromium stearato chloride | 1–3. |
| Modifying agent | 0–8. |
| Buffer | Sufficient to adjust pH to 3.0–5.0. |
| Solvent | Sufficient for mutual solution at a spreading viscosity. |

In a preferred method of formulating the above release coating composition, the dry, powdered hydroxyethyl cellulose first may be dissolved in the predetermined amount of aqueous solvent. The modifying agent, e. g. glycerine then is added as required to give the final film the desired flexibility. Next the buffer chemicals may be added as required to adjust the pH to between about pH 3.0 and about pH 5.0. The alcoholic solution of chromium stearato chloride then may be added, and the mixture thoroughly agitated. A film having better release properties is obtained if the foregoing mixture is permitted to stand for at least two hours after thorough mixing has been completed, to permit the coaction of the various ingredient and form the final product.

The repellent coating formulated in the above described manner may be applied to the kraft paper or other sheet material of which the final tape is to be made by any conventionally used equipment such as a kiss roll followed by a doctor knife, a mayer rod or smoothing bar. The amount applied should be sufficient for the final film to mask entirely the surface of the sheet backing. In practice this requires a coating weight of 5 to 10 pounds per 3,000 square feet of backing.

To be fully effective for the purposes of this invention, the film applied as above should be dried and heated to a temperature of a least about 240° F. for at least about one-half minute. Although the reactions occurring during this heat treatment are obscure, it is apparent that the character of the composition is altered fundamentally. This is evidenced by a permanent improvement in the repellent characteristics of the backing layer as well as by the fact that the chromium compound changes from its original green color to a blue color, while the hydroxyethyl cellulose, originally water soluble, becomes water insoluble. Possibly one of the actions occurring is the conversion of the chromium stearato chloride to chromium stearate. However, whatever their nature, the reactions between the constituents of the mixture result in the formation of a final repellent coating having the desired properties to a high degree.

THE ADHESIVE COATING

As has been indicated above, a basic constituent of the adhesive used in conjunction with the presently described release coating in the production of a pressure sensitive adhesive tape basically comprises a vulcanized rubber. This material has been found uniquely suited for use with the repellent backing compositions described herein in that it does not react with such backings either physically or chemically, even though it may be in contact therewith over long periods of time. As a result, the presently described pressure sensitive adhesive tapes may be stored in roll form over long periods of time, after which they may be unrolled without effort or delamination of the base material. Then, after unrolling, they may be applied to the uniting of materials with conspicuous success.

A wide variety of vulcanized rubbers may be employed, either natural or synthetic. Particularly well suited, however, are the commercial products sold as reclaim rubber which largely comprise vulcanized rubber recovered from commercial tires. That recovered from automobile tire inner tubes is a preferred material for the purpose of this invention. These and other rubber products may be used in the solid form or in the form of their latices, for examples in the form of an aqueous dispersion containing about 60% by weight rubber solids (about 50% rubber hydrocarbons with about 10% resin and fillers). They may, if desired, be suitably modified by the incorporation of plasticizers, antioxidants, and materials for controlling their properties of tackiness and cold flow. They then may be applied to the backing as solutions or emulsions using conventional techniques and apparatus.

The presently described release coatings for pressure sensitive tapes and their production and application are further illustrated in the following examples wherein parts are given as parts by weight.

EXAMPLE 1

The coating composition had the following formula:

| | Parts |
|---|---|
| Hydroxyethyl cellulose (Cellosize WPLM) | 30. |
| Chromium stearato chloride; 40% by weight solution in propylalcohol (Quilon G–1050) | 30. |
| Glycerine | 30. |
| Buffer solution | Sufficient to adjust pH to 3.0–5.0 |
| Water | 310. |

The buffer solution employed had the following composition:

| | |
|---|---|
| Urea | 16.5 |
| Sodium formate | 5.0 |
| Formic acid | 0.2 |
| Water | 78.3 |

The release coating was made by first dissolving the dry powdered hydroxyethyl cellulose in the water. To the resulting solution were added the buffer, the glycerine, and the chromium stearato chloride the latter being added last.

The release coating then was applied by means of a kiss roll followed by a doctor knife to a sheet of ordinary commercial kraft paper, using a sufficient amount of the material to mask the surface of the paper entirely. This required a coating weight of 5 to 10 pounds per ream.

The coated sheet was heated to a temperature of 240° F. for about 1 minute. The dried sheet then was cut into strips which were rolled to form a product ready for use.

EXAMPLE 2

This example illustrates another composition suitable for use as a release coating in the tapes of the presently described class.

The coating was formulated in the same manner as described in Example 1. It had, however, the following composition.

| | Parts |
|---|---|
| Hydroxyethyl cellulose (C e l l o s i z e WP-40) | 20. |
| Chromium stearato chloride; 40% solution in propyl alcohol (Quilon G-1050) | 20. |
| Glycerine | 20. |
| Ethyl alcohol | 20. |
| Buffer solution | Sufficient to adjust pH to 3.0–5.0 |
| Water | 466. |

The final composition had a viscosity suitable for application, i. e. one of below about 5,000 centipoises, and, when applied to a kraft paper backing in the manner described in Example 1, demonstrated superior release properties.

EXAMPLE 3

This example illustrates an adhesive coating for use in conjunction with the above illustrated release coating in preparing pressure sensitive tapes. The coating had the following formula:

| | Parts |
|---|---|
| Vulcanized rubber | 65.0 |
| Solid resin (polymerized beta-pinene; "Piccolyte S-85") | 37.5 |
| Plasticizer (polymerized styrene and styrene homologs; "Piccolastic A-5") | 18.75 |
| Antioxidant (Agerite gel) | 0.88 |
| Heptane solvent | 360.0 |

The rubber was milled in a Banbury mixer and introduced with vigorous agitation into the heptane solvent together with the solid resin, the plasticizer and the antioxidant. After the solution of these materials was complete, the resulting solution was applied to the uncoated surface of kraft paper; one surface of which had previously been coated with the presently described release coating. Sufficient of the adhesive mixture was then applied to form a continuous coating over the surface of the paper and to provide a coating having the desired degree of adhesion. This required an application of from 20 to 25 lbs. per 3,000 square feet of backing.

The coated paper then was passed through a hot air chamber at a temperature sufficiently high to volatilize the solvent. Thereafter the sheet was cut into strips which, in turn, were rolled to form the final product. Tests carried out upon the tape prepared in this manner over a period of 24 months revealed that the rolls could be unrolled without delamination of the paper backing, that there was no interaction between the adhesive coating and the release coating with which it was in contact, and that the adhesive coating retained its tackiness and adhesive qualities.

EXAMPLE 4

Other pressure sensitive tapes were prepared using, in place of the chromium stearato chloride of the foregoing examples, chromium laurato chloride, chromium oleato chloride, and chromium palmitato chloride, and using the procedure outlined in Example 1 for preparation of the release coating, and of Example 3 for preparation of the adhesive coating. In each case, the tapes produced had the desirable properties noted herein.

Having now described our invention in preferred embodiments, we claim:

1. A release coating for pressure sensitive adhesive tapes comprising: hydroxyethyl cellulose and a complex compound of the Werner type in which a trivalent nuclear chromium atom is coordinated with an acyclic carboxylic acid having from 12 to 18 carbon atoms, inclusive.

2. A release coating for pressure sensitive adhesive tapes comprising: hydroxyethyl cellulose, a complex compound of the Werner type in which a trivalent nuclear chromium atom is coordinated with an acyclic carboxylic acid having from 12 to 18 carbon atoms, inclusive, and a liquid vehicle.

3. A release coating for pressure sensitive adhesive tapes comprising hydroxyethyl cellulose and chromium stearato chloride.

4. A release coating for pressure sensitive adhesive tapes comprising: 5 parts hydroxyethyl cellulose, from 1–3 parts of a complex compound of the Werner type in which a trivalent nuclear chromium atom is coordinated with an acyclic carboxylic acid having from 12 to 18 carbon atoms, inclusive, parts being expressed as parts by weight, and a liquid vehicle used in amount sufficient for mutual solution of the hydroxyethyl cellulose and the complex compound.

5. The release coating of claim 4 wherein the complex compound consists of chromium stearato chloride.

6. The release coating of claim 4 wherein the complex compound consists of chromium palmitato chloride.

7. The release coating of claim 4 wherein the complex compound consists of chromium laurato chloride.

8. A release coating for pressure sensitive adhesive tapes comprising: 5 parts hydroxyethyl cellulose and from 1–3 parts of a complex compound of the Werner type in which a trivalent nuclear chromium atom is coordinated with an acyclic carboxylic acid having from 12 to 18 carbon atoms, inclusive, parts being expressed as parts by weight, a liquid vehicle used in amount sufficient for mutual solution of the hydroxyethyl cellulose and the complex compound and a buffer used in amount sufficient to adjust the pH of the coating to a value of between 3 and 5.

9. A release coating for pressure sensitive adhesive tapes comprising: 5 parts hydroxyethyl cellulose, from 1–3 parts of a complex compound of the Werner type in which a trivalent nuclear chromium atom is coordinated with an acyclic carboxylic acid having from 12 to 18 carbon atoms, inclusive, parts being expressed as parts by weight, a liquid vehicle used in amount sufficient for mutual solution of the hydroxyethyl cellulose and the complex compound, and a coating-plasticizing quantity of a plasticizing agent.

10. A release coating for pressure sensitive adhesive tapes comprising: 5 parts hydroxyethyl cellulose and from 1–3 parts of a complex compound of the Werner type in which a trivalent nuclear chromium atom is coordinated with an acyclic carboxylic acid having from 12 to 18 carbon atoms, inclusive, parts being expressed as parts by weight, a liquid vehicle used in amount sufficient for mutual solution of the hydroxyethyl cellulose and the complex compound, a buffer used in amount sufficient to adjust the pH of the coating to a value of between 3 and 5, and a coating-plasticizing quantity of a plasticizing agent.

11. A release coating for pressure sensitive adhesive tapes comprising: 5 parts hydroxyethyl cellulose and from 1–3 parts chromium stearato chloride, parts being expressed as parts by weight, a liquid vehicle used in amount sufficient for mutual solution of the hydroxyethyl cellulose and the chromium stearato chloride, and a buffer used in amount sufficient to adjust the pH of the coating to a value of between 3 and 5.

12. A release coating for pressure sensitive adhesive tapes comprising: 5 parts hydroxyethyl cellulose and from 1–3 parts chromium stearato chloride, parts being expressed as parts by weight, a liquid vehicle used in amount sufficient for mutual solution of the hydroxyethyl cellulose and the chromium stearato chloride, a buffer used in amount sufficient to adjust the pH of the coating to a value of between 3 and 5, and a coating-plasticizing quantity of a plasticizing agent.

13. The process of making a flexible sheet having a release coating thereon which comprises applying to a surface of a flexible sheet a release coating comprising hydroxyethyl cellulose and a complex compound of the Werner type in which a trivalent nuclear chromium atom is coordinated with an acyclic carboxylic acid having from 12 to 18 carbon atoms, inclusive, and heating the resulting coated sheet at a temperature of about 240° F. but below the decomposition temperature of the coating constituents for effectuating a reaction between the hydroxyethyl cellulose and the complex compound.

14. The process of claim 13 wherein the pH of the release coating is between 3 and 5.

15. The process of claim 13 wherein the release coating comprises hydroxyethyl cellulose and a complex compound of the Werner type in which a trivalent nuclear chromium atom is coordinated with an acyclic carboxylic acid having from 12 to 18 carbon atoms, inclusive, and a liquid vehicle therefor.

16. The process of claim 13 wherein the release coating comprises hydroxyethyl cellulose and chromium stearato chloride.

No references cited.